US011314841B1

(12) United States Patent
Montgomery et al.

(10) Patent No.: US 11,314,841 B1
(45) Date of Patent: Apr. 26, 2022

(54) WEB BROWSER COMMUNICATION VALIDATION EXTENSION

(71) Applicant: Bank of America Corporation, Charlotte, NC (US)

(72) Inventors: Andrew Paul Montgomery, London (GB); Stuart David Ford, Slapton (GB); Ricardo Varanda, Reading (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/143,734

(22) Filed: Jan. 7, 2021

(51) Int. Cl.
*G06F 16/958* (2019.01)
*H04L 67/02* (2022.01)

(52) U.S. Cl.
CPC ............ *G06F 16/986* (2019.01); *H04L 67/02* (2013.01)

(58) Field of Classification Search
CPC ..... G06F 40/143; G06F 16/986; H04L 67/02; H04L 63/1466
USPC .................. 715/234, 200; 713/171, 155, 176
See application file for complete search history.

(56) References Cited

U.S. PATENT DOCUMENTS

| | | | |
|---|---|---|---|
| 7,630,986 B1 | 12/2009 | Herz et al. | |
| 8,448,241 B1* | 5/2013 | Kadakia | G06F 11/3688 726/22 |
| 8,549,298 B2 | 10/2013 | Rouskov et al. | |
| 8,566,901 B2 | 10/2013 | Kay et al. | |
| 8,566,919 B2* | 10/2013 | Meisel | H04L 63/0227 726/13 |
| 8,838,973 B1* | 9/2014 | Yung | H04L 63/0838 713/175 |
| 9,225,803 B2* | 12/2015 | Nanduri | H04L 63/166 |
| 9,578,044 B1 | 2/2017 | Sharma et al. | |
| 9,691,051 B2 | 6/2017 | Rexer et al. | |
| 10,157,280 B2* | 12/2018 | Amir | H04L 63/145 |
| 10,462,216 B1 | 10/2019 | Vysotsky et al. | |
| 2006/0085421 A1* | 4/2006 | Backhouse | G06F 16/958 |
| 2009/0282485 A1 | 11/2009 | Bennett | |

(Continued)

OTHER PUBLICATIONS

White James, Improve your privacy and security with HTTPS Everywhere, published Aug. 25, 2017 via mediam.com, pp. 1-5 (pdf).*

(Continued)

*Primary Examiner* — Manglesh M Patel
(74) *Attorney, Agent, or Firm* — Banner & Witcoff, Ltd.

(57) ABSTRACT

A computing device comprising a secure browser extension for a web browser monitors for satisfaction of one or more operating conditions to identify whether one or more unauthorized applications are installed on the computing device. Based on satisfaction of at least one operating condition, the secure browser extension of the computing device sends an HTTP request to a known service via the web browser. The secure browser extension receives a response to the HTTP request via the web browser. The secure browser extension determines whether the received response is an HTTP response (e.g., from an unauthorized application) or a non-HTTP response (e.g., from the known service). Based on determining the received response is an HTTP response, the secure browser extension terminates the web browser session and generates a notification for display at the computing device that indicates web browser communications are compromised.

20 Claims, 5 Drawing Sheets

(56) References Cited

U.S. PATENT DOCUMENTS

| | | | |
|---|---|---|---|
| 2009/0292925 A1* | 11/2009 | Meisel | H04L 63/0876 |
| | | | 713/176 |
| 2013/0019092 A1* | 1/2013 | Levow | H04L 63/1466 |
| | | | 713/155 |
| 2016/0142438 A1* | 5/2016 | Pastore | H04L 63/08 |
| | | | 713/171 |
| 2017/0257393 A1* | 9/2017 | De Barros | H04L 63/1416 |
| 2018/0295137 A1 | 10/2018 | Zager et al. | |
| 2019/0215304 A1 | 7/2019 | Yang et al. | |
| 2019/0222588 A1* | 7/2019 | Marzorati | H04L 69/16 |
| 2020/0082124 A1 | 3/2020 | Pedersen | |
| 2020/0250316 A1 | 8/2020 | Rickerd et al. | |
| 2020/0356661 A1 | 11/2020 | Stoletny et al. | |

OTHER PUBLICATIONS

Lawrence Eric, Avoiding the Not Secure Warning in Chrome, published Dec. 2020 via wayback machine, pp. 1-4 (pdf).*

Serge Truth, How to Test for Man-in-the-Middle VulnerabilitiesHow Vulnerabilities, Published Jun. 21, 2011 by securityinnovation.com, pp. 1-23 (pdf).*

Amos Kingatua, 6 HTTP MITM Attack Tools for Security Researchers, Published Jul. 7, 2021 by geekflare.com, pp. 1-21 (pdf).*

* cited by examiner

WEB BROWSER COMMUNICATION VALIDATION EXTENSION

BACKGROUND

Aspects of the disclosure relate to identifying compromised communications via a computing device. One or more aspects of the disclosure relate to a computing platform having a web browser extension that is capable of detecting malicious software applications that access web browser communications and preventing compromised web browser communications at the computing platform.

Today, communications (e.g., web browser communications) associated with a variety of endpoint computing devices (e.g., personal computing devices, mobile phones, tablets, and the like) are vulnerable to unauthorized exposure. These communications may be compromised via malicious applications operating on the endpoint computing device itself, as well as via compromised computing devices running malicious software that access networked devices operating between the endpoint computing devices and server devices. The malicious applications (e.g., middle agents) may, for example, execute "man in the middle" interception of communications, where a third party computing device may operate as a proxy to monitor and/or modify communications between the endpoint computing devices and the server devices without user consent. As such, a compromised endpoint computing device may expose a user's private and/or sensitive information (e.g., login credentials, security keys, and the like) to a third party during networked communications, such as when communicating with a server device via a web browser.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting interception (e.g., "man in the middle" and/or "man in the browser" interception) of web browser communications and preventing exposure of sensitive information via a web browser.

In some cases, a computing device (e.g., a laptop computing device, a desktop computing device, a mobile phone, a tablet, and the like) may include an installed web browser. The web browser may be an application stored on a computer-readable media device of the computing device and may enable the computing device to access and/or request information (e.g., a web page) from remote services and/or local services hosted at a remote computing device (e.g., a remote server device) and/or a local computing device (e.g., a local server device and/or the computing device). In some cases, the computing device may include a browser extension such as an application (e.g., an add-on, a plugin, an extension, and the like) stored on a computer-readable media device of the computing device to supplement, add, and/or otherwise modify the functionality of the web browser. The browser extension may include one or more computer readable instructions, when executed, to enable detection of compromised communications associated with one or more malicious applications (e.g., "man in the middle" applications, malware, and the like) operating at the computing device, where the one or more malicious applications may intercept communications (e.g., via Hypertext Transfer Protocol (HTTP), HTTP Secure (HTTPS), and the like) sent and/or received by the computing device via the web browser.

The browser extension may determine whether communications sent and/or received by the web browser are compromised, for example, before the web browser sends sensitive information (e.g., login credentials, security keys, passwords, and the like) to a local and/or remote service. To preemptively detect compromised communications, the browser extension may send, by the web browser, an HTTP request (e.g., an internal HTTP request) to a local service hosted at the computing device. The local service may be a non-HTTP service (e.g., a service that uses File Transfer Protocol (FTP), Simple Mail Transfer Protocol (SMTP), and the like) that is incapable of processing the HTTP request. Based on whether a malicious application (e.g., a "man in the middle" application) is operating at the computing device, the browser extension may receive, by the web browser, an HTTP response or a non-HTTP response to the HTTP request. The browser extension may receive an HTTP response (e.g., from the malicious application), for example, if a malicious application that intercepts web browser communications is operating at the computing device. The browser extension may receive a non-HTTP response (e.g., from the non-HTTP local service), for example, if a malicious application that intercepts communications is not operating at the computing device. Based on receiving an HTTP response, the browser extension may deactivate communications to/from the web browser or may terminate the web browser tab, window, and/or session. In some cases, based on receiving an HTTP response, the browser extension may generate a notification for display via the web browser at a display device of the computing device, where the notification includes an indication that communications are compromised. Based on receiving a non-HTTP response, the browser extension may permit the web browser to continue operating (and send/receive communications).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Today, malicious applications, such as middle agents, may operate to intercept, monitor, and/or otherwise control communications between one or more computing devices (e.g., endpoint computing devices, server computing devices, and the like). These communications may include client-server communications, such as those between endpoint computing devices (e.g., personal computing devices, mobile phones, tablets, and the like) and provider computing devices (e.g., server computing devices) via a network (e.g., a local area network, a wide area network, and the like). A middle agent may operate on and/or access an endpoint device, a provider device, and/or an intermediate network device (e.g., a modem device, a router device, and the like) to intercept or otherwise monitor communications to steal sensitive and/or private information without user and/or provider consent. For example, a middle agent operating on a personal computing device may intercept an HTTPS request from a web browser prior to encryption, where the request may include sensitive login credential information for accessing a financial account on a banking website. The middle agent may forward the request to the intended server device that hosts the banking website. The server device may send an HTTPS response to the personal computing device. The middle agent may intercept the response at the personal computing device. The middle agent may forward the response to the web browser of the personal computing device, allowing the middle agent to monitor and modify the communications between the personal computing device and server device without the consent of each party. In some cases, at least some middle agents may operate based on an assumption that the intercepted requests and responses will be using a certain configured communication protocol (e.g., HTTP and/or HTTPS). For example, a middle agent may be configured to forward communications as only HTTP requests and/or corresponding HTTP responses. Some middle agents may forward a response and/or request using a communication protocol different from the communication protocol of the received response and/or request.

In some cases, a computing device, such as a personal computing device, may include a browser extension integrated with a web browser. The browser extension may be stored as an application and/or as source code on a computer-readable media device of the computing device. The source code of the browser extension may be executed by a web browser. While web browsers commonly permit the use of browser extensions to modify the functionality of the web browsers, existing browser extensions lack capabilities to detect "man in the middle" (e.g., "man in the browser") interception from a malicious application (e.g., a middle agent) and prevent unauthorized data exposure to a third-party via the web browser. As such, a need has been identified for an improved computing system that uses a browser extension to detect locally compromised client-server communications via a web browser and prevent exposure of sensitive information to an unknown third-party.

An improved browser extension may enable detection of middle agents that compromise communications sent and/or received by a web browser. To determine whether communications via the web browser are locally compromised on the computing device and/or to prevent exposure of sensitive information, the browser extension may send a test request (e.g., an HTTP request) to a local service based on or more conditions. The local service may be an application, a program, and/or other data hosted locally at the computing device and/or available via a local area network (LAN) (e.g., hosted a local server device). The local service may be a non-HTTP service that is not configured for HTTP communications. The browser extension may send a request to a local service, for example, based on a condition. The condition may be a startup/activation of the web browser, a communication and/or connection (e.g., an attempted communication and/or connection) by the web browser via HTTPS (e.g., to send login credentials, security keys, and the like), and/or a communication and/or connection to a configured service via the web browser. In some cases, the condition may be the expiry of a configured time duration.

Based on sending the request to a local service, the browser extension may wait for a response (e.g., an HTTP response or a non-HTTP response) before allowing further communications. The browser extension may expect a non-HTTP response, for example, if a middle agent is not operating at the computing device, as the local service may respond to the HTTP request with a non-HTTP response (e.g., an FTP error response, a SMTP error response) based on the communication protocol of the local service. The browser extension may expect the response to be formatted with an expected protocol based on which local service is the target of the request. For example, the extension may expect to receive a non-HTTP response from a local service and may identify a problem if a response of a different format is received. For example, an HTTP response may be received in response to a non-HTTP formatted request from a local service if a middle agent is operating at the computing device, as the middle agent may intercept a non-HTTP response from the local service and forward an HTTP-formatted response to the computing device. The browser extension may expect an HTTP response to a non-HTTP request when, for example, a middle agent is operating on the computing device, as the middle agent may generate an HTTP response and forward the HTTP response to the web browser of the computing device.

Based on receiving the HTTP response, the browser extension may determine that communications to the local service (and other communications via the web browser) are compromised. Based on determining that communications to the local service are compromised, the browser extension may generate, for display at a display device of the computing device, a notification (e.g., an error message, a pop-up window, an audio indication, a visual indication, an alert message, and the like) indicating that communications via the web browser are compromised. In some cases, the browser extension may close the web browser to prevent exposure of information (e.g., sensitive information) to a third party. In some cases, the browser extension may receive a non-HTTP response from the local service. Based on receiving the non-HTTP response, the browser extension may determine that communications to the local service (and other communications via the web browser) are not compromised (e.g., secure). Based on determining that communications to the local service are not compromised, the browser extension may permit the session at the web browser to continue. In some cases, the browser extension may generate, for display at a display device of the computing device, a notification indicating that communications via the web browser are secure.

Figure 1A:
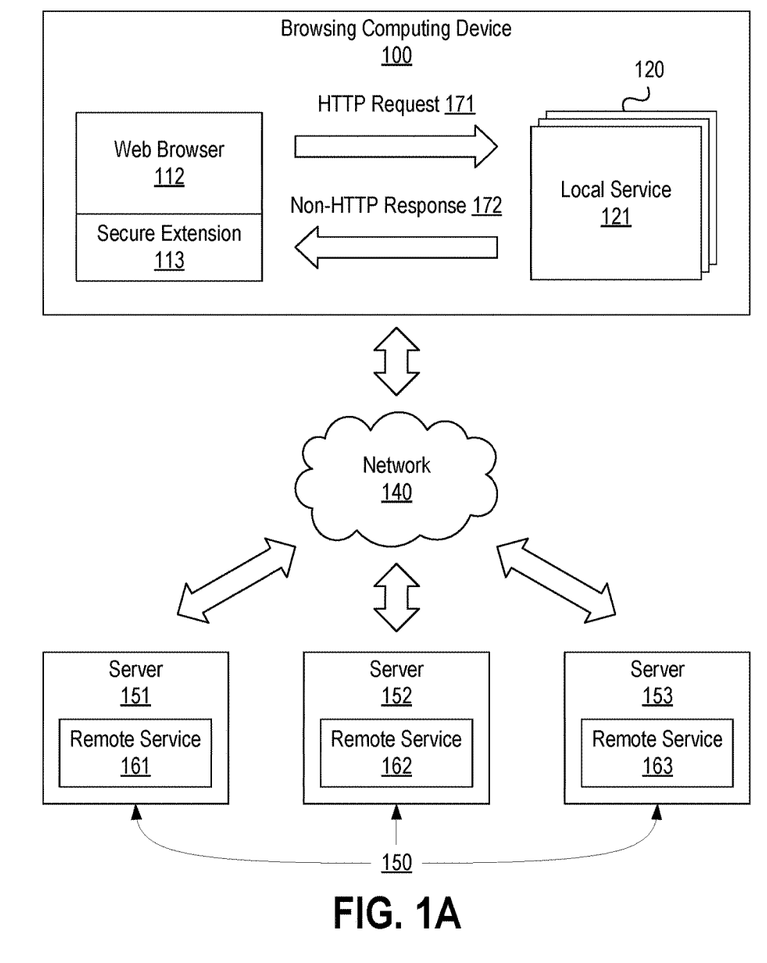
FIG. 1A shows an illustrative example of expected communications for an uncompromised system in accordance with one or more aspects described herein.
Figure 1B:
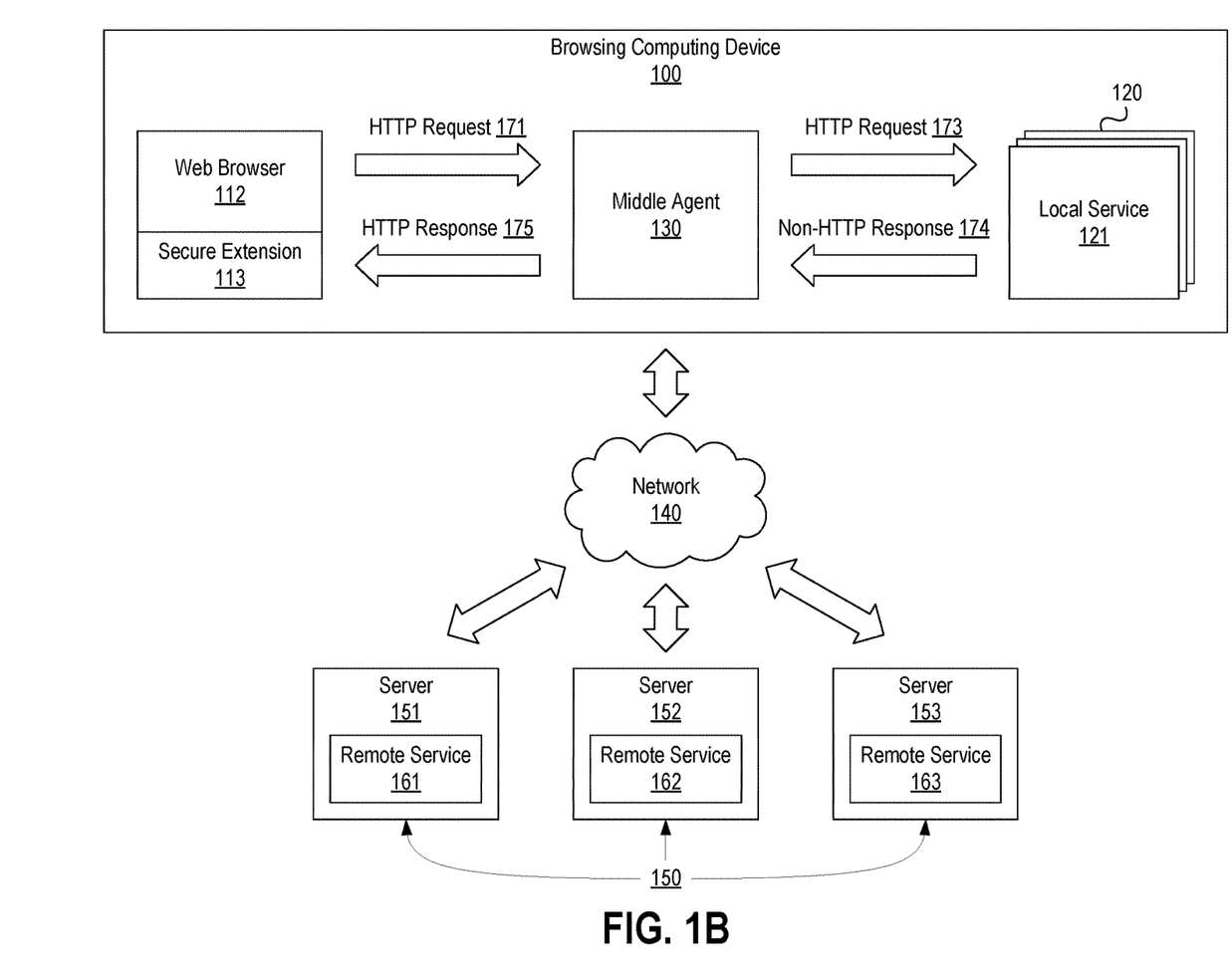
FIG. 1B shows an illustrative example of expected communications for a compromised system in accordance with one or more aspects described herein.

FIG. 1A and FIG. 1B show illustrative examples of expected communications for an uncompromised system and a compromised system in accordance with one or more aspects described herein. Referring to FIG. 1A, a browsing computing device 100 may include any or all of the characteristics of the browsing computing device 301 as described herein with respect to FIG. 3 and/or the workstations 401 as described herein with respect to FIG. 4. The browsing computing device 100 may be a laptop computing device, a desktop computing device, a mobile phone, a tablet, and/or any other personal computing device. The browsing computing device 100 may be an endpoint computing device for client-server communications between the browsing computing device 100 and a provider computing device (e.g., one or more servers 150). The browsing computing device 100 may be communicatively coupled to one or more networks 140. The one or more networks 140 may include any or all of the characteristics of the network 331 and/or the computer network 403 as described herein with respect to FIG. 3 and FIG. 4. For example, the browsing computing device 100 may be connected (e.g., by a wireless connection and/or a wired connection) to the one or more networks 140 by a LAN (e.g., LAN 325), a WAN (e.g., WAN 329), and/or other communication links (e.g., communications links 402 and/or 405). One or more servers 150 may communicatively connected to the one or more networks 140 by a LAN (e.g., LAN 325), a WAN (e.g., WAN 329), and/or other communication links (e.g., communications links 402 and/or 405). The one or more servers may include a server 151, a server 152, and/or a server 153. The one or more servers 150 may include any or all of the characteristics of the server 204 as described herein with respect to FIG. 2. The one or more servers 150 may host one or more remote services. The one or more remote services may include remote service 161, remote service 162, and/or remote service 163. The one or more remote services may include websites (e.g., financial websites, social media websites, e-commerce websites), applications, and/or programs. The one or more remote services may communicate using one or more communication protocols (e.g., HTTP, HTTPS, FTP, SMTP, and the like).

Figure 3:
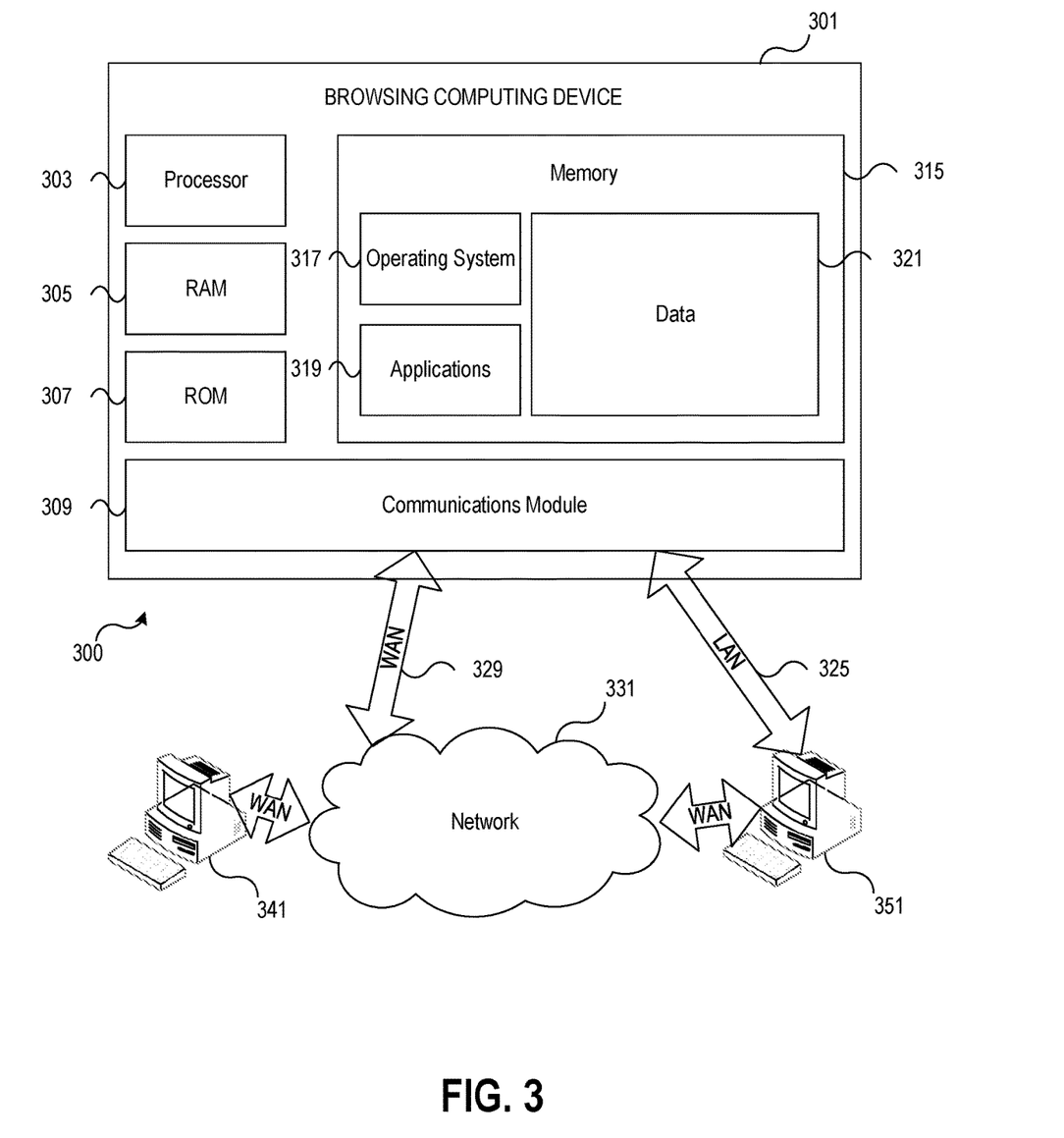
FIG. 3 shows an illustrative operating environment in which various aspects of the disclosure may be implemented in accordance with one or more aspects described herein.

FIG. 3 shows an illustrative operating environment 300 in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative browsing computing device 301 having a processor 303 for controlling overall operation of the browsing computing device 301 and its associated components, including a Random Access Memory (RAM) 305, a Read-Only Memory (ROM) 307, a communications module 309, and a memory 315. The browsing computing device 301 may include a variety of computer readable media. Computer readable media may be any available media that may be accessed by the browsing computing device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the browsing computing device 301.

Although not required, various aspects described herein may be embodied as a method, a computing (e.g., data transfer) system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the browsing computing device 301. Such a processor may execute computer-executable instructions stored on a computer-readable medium.

Software may be stored within the memory 315 and/or other digital storage to provide instructions to the processor 303 for enabling the browsing computing device 301 to perform various functions as discussed herein. For example, the memory 315 may store software used by the browsing computing device 301, such as an operating system 317, one or more application programs 319 (e.g., a web browser application), and/or an associated database 321. In addition, some or all of the computer executable instructions for the browsing computing device 301 may be embodied in hardware or firmware. Although not shown, the RAM 305 may include one or more applications representing the application data stored in the RAM 305 while the browsing computing device 301 is on and corresponding software applications (e.g., software tasks) are running on the browsing computing device 301.

The communications module 309 may include a microphone, a keypad, a touch screen, and/or a stylus through which a user of the browsing computing device 301 may provide input, and may include one or more of a speaker for providing audio output and a video display device for providing textual, audiovisual and/or graphical output. The computing system environment 300 may also include optical scanners (not shown).

The browsing computing device 301 may operate in a networked environment supporting connections to one or more remote computing devices, such as the computing devices 341 and 351. The computing devices 341 and 351 may be personal computing devices or servers that include any or all of the elements described above relative to the browsing computing device 301.

The network connections depicted in FIG. 3 may include a Local Area Network (LAN) 325 and/or a Wide Area Network (WAN) 329, as well as other networks. When used in a LAN networking environment, the browsing computing device 301 may be connected to the LAN 325 through a network interface or adapter in the communications module 309. When used in a WAN networking environment, the browsing computing device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
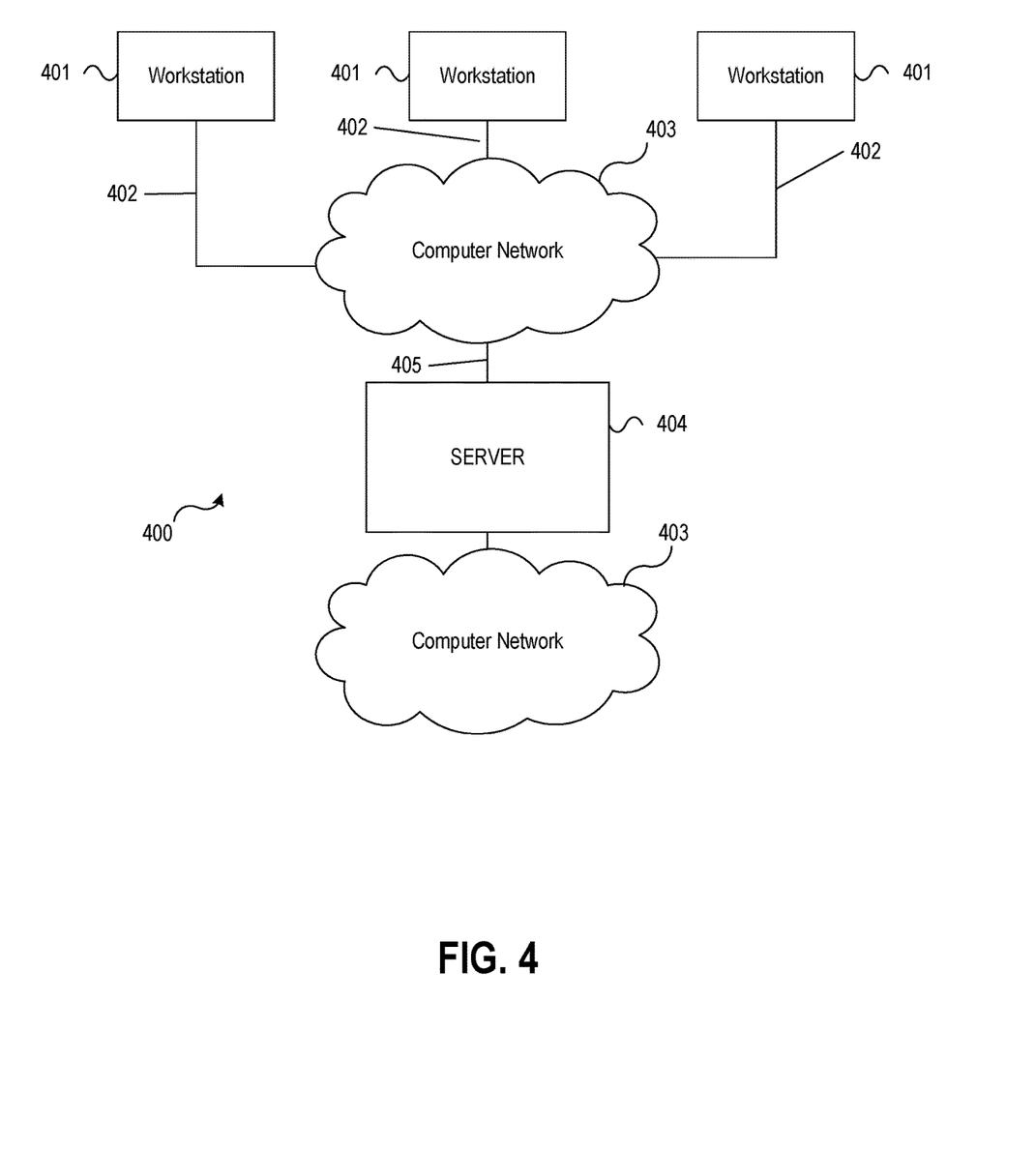
FIG. 4 shows an illustrative block diagram of workstations and servers that may be used to implement the pro-

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. Referring to FIG. 4, as illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the server 404. In the system 400, the server 404 may be a server, processor, computer, or data processing device, or combination of the same, configured to perform the functions and/or processes described herein. The server 404 may host local services and/or remote services. The server 404 may receive requests and send responses based on the protocol(s) associated with the local services and/or remote services.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the server 404, such as network links, dial-up links, wireless links, hard-wired links, as well as network types developed in the future, and the like.

Referring to FIG. 1A, in some cases, the browsing computing device 100 may include a web browser 112. The web browser 112 may be an application (e.g., an application 119) stored on computer readable media device (e.g., the memory 115) of the browsing computing device 100. The web browser 112 may enable the browsing computing device 100 to access information on the World Wide Web (e.g., hosted by the one or more servers 150), for example, based on requests (and responses) via HTTP and/or HTTPS. In some cases, the browsing computing device 100 may include a secure extension 113. The secure extension 113 may be an application, an extension, a plugin, and/or a program that integrates with and/or modifies the functionality of a web browser (e.g., the web browser 112). The secure extension 113 may be stored on a computer readable media device (e.g., the memory 115) of the browsing computing device 100. The secure extension 113 may be available in one or more configurations/versions for compatibility with one or more web browsers. The secure extension 113 may be managed/configured by a developer and/or an enterprise organization associated with the browsing computing device 100 and/or a user of the browsing computing device 100. For example, an enterprise organization may install the secure extension 113 on a browsing computing device 100 associated with an individual of the enterprise organization. In some cases, the browsing computing device 100 may include and/or have access to one or more local services 120. The one or more local services 120 may include applications (e.g., the applications 319) and/or programs accessible at the browsing computing device 100. The one or more local services may include applications, programs, and/or other data accessible via a LAN (e.g., LAN 125). In some cases, at least some of the one or more local services 120 may be non-HTTP application layer services. For example, at least some of the one or more local services may use FTP, SMTP, Internet Message Access Protocol (IMAP), and/or any other application layer protocol.

Referring to FIG. 1A, in some cases, the secure extension 113 may perform one or more operations to determine whether communications to/from the web browser 112 are compromised (e.g., by a middle agent operating at the browsing computing device 100). The secure extension 113 may perform the one or more operations, for example, based on a condition. In some cases, the condition may be a connection and/or an attempted connection to an HTTPS service. Based on a connection and/or an attempted connection to an HTTPS service, the secure extension 113 may perform the one or more operations. For example, a user may access a social media website (e.g., a remote service 161 hosted at the server 151) using HTTP via the web browser 112. To input login credentials at the social media website, the protocol may change to HTTPS. Based on the connection to the HTTPS login webpage, the secure extension 113 may perform the one or more operations. In some cases, the condition may be activation and/or startup of the web browser 112. Based on startup of the web browser 112, for example, the secure extension 113 may perform the one or more operations. In some cases, the condition may be accessing one or more configured services (e.g., domains) via the web browser 112. The one or more configured services may be configured by a developer and/or enterprise organization associated with the secure extension 113. For example, an enterprise organization may configure an authentication web page associated with the domain (e.g., the remote service 162) of an enterprise organization as a configured service. Based on connection (e.g., sending a request) to a configured service, the secure extension 113 may perform the one or more operations. In some cases, the condition may be the expiration of a time duration (e.g., a periodic time duration). The time duration may be configured by a developer and/or enterprise organization associated with the secure extension 113. Based on the expiration of the time duration, the secure extension 113 may perform the one or more operations.

In some cases, the secure extension 113 may send an HTTP request 171 to a non-HTTP local service (e.g., a local service 121) of the one or more local services 120. The secure extension 113 may send the HTTP request 171 to a known (e.g., trusted) non-HTTP local service identified in a service configuration of the secure extension 113. The local service 121 may receive the HTTP request 171. The local service 121 may not be able to process the HTTP request 171, for example, based on being a non-HTTP local service. The non-HTTP local service may be configured to operate using one or more non-HTTP application layer protocols. The local service 121 may send a non-HTTP response 172 (e.g., an error response) according to the configured non-HTTP protocol of the local service 121, for example, based on receiving the HTTP request 171.

In some cases, the secure extension 113 may receive a response (e.g., a non-HTTP response 172) from the local service 121. The secure extension 113 may determine that the received response does not have an HTTP status line. The secure extension 113 may determine that the received non-HTTP response 172 is a non-HTTP response, for example, based on determining that the received non-HTTP response 172 does not include an HTTP status line. The secure extension 113 may determine that communications via the web browser 112 are secure (e.g., secure from a middle agent 130), for example, based on determining the received non-HTTP response 172 is not an HTTP response. The secure extension 113 may be configured to associate a received non-HTTP response (e.g., non-HTTP response 172) with secure communications that do not include a middle agent (e.g., middle agent 130) operating at the web browser 112 and/or at the browsing computing device 100. The secure extension 113 may generate one or more notifications for display at a display device (e.g., of the communications module 109) of the browsing computing device 100. For example, based on receiving the non-HTTP response 172, the secure extension 113 may generate a notification for display that indicates the communications of the web browser 112 are secure.

Referring to FIG. 1B, in some cases, the browsing computing device 100 may be compromised by a middle agent 130. The middle agent 130 may be stored on a computer-readable media device (e.g., memory 115) of the browsing computing device 100. For example, the middle agent 130 may be installed at a same directory (e.g., of a file system of the memory 115) as the web browser 112. In some cases, the middle agent 130 may be installed at the browsing computing device 100 by a malicious application and/or malicious program (e.g., malware). For example, a user of the browsing computing device 100 may install (e.g., unintentionally install) the middle agent 130 from a malicious email attachment. The middle agent 130 may be an application, an extension, a program, and/or a plugin that monitors and/or intercepts communications sent/received by the web browser 112. The middle agent 130 may operate at the browsing computing device 100 without the consent/permission of the browsing computing device 100 and/or the user of the browsing computing device 100. In some cases, the middle agent 130 may integrate with the web browser 112.

In some cases, the middle agent 130 may perform one or more operations. The middle agent 130 may operate as a "man in the middle" agent and/or a "man in the browser" agent, where the middle agent 130 may intercept communications between the web browser 112 of the browsing computing device 100 and a local service (e.g., local service 121) and/or a remote service (e.g., a website hosted by the server 151). The middle agent 130 may intercept communications via HTTP and/or HTTPS. Based on the intercepted communications between the web browser 112 and a local service and/or a remote service, the middle agent 130 may route further communications accordingly between the web browser 112 and the local service and/or the remote service to the middle agent 130. The middle agent 130 may intercept communications via HTTPS, for example, based on accessing communications initiated at the web browser 112 before the communications are encrypted (e.g., by the Secure Sockets Layer/Transport Layer Security (SSL/TLS) channel) and/or after communications are decrypted. In some cases, based on intercepting and/or receiving communications of a communication protocol (e.g., FTP, SMTP, IMAP, and the like) different from the configured communication protocol (e.g., HTTP and/or HTTPS), the middle agent 130 may generate and/or send communications of the configured communication protocol. For example, the middle agent 130 may receive an SMTP communication from a local service 121 and may send an HTTP response to the web browser 112. The generated communications may include payload information from the intercepted/received request and/or response. The generated communications may include expected source information (e.g., source address information) from a service indicated in the received communications. For example, the middle agent 130 may generate and send an HTTP response to the web browser 112 that includes information identifying the remote service 161 as the source of the HTTP response, where the middle agent 130 previously received an HTTP request from the web browser 112 that indicated the remote service as the destination of the HTTP request.

In some cases, based on a condition as described herein, the secure extension 113 may send an HTTP request 171 to a non-HTTP local service (e.g., a local service 121) of the one or more local services 120. The secure extension 113 may send the HTTP request to a known (e.g., trusted) non-HTTP local service identified in a service configuration of the secure extension 113. The middle agent 130 may intercept the HTTP request 171. Based on intercepting the HTTP request 171, the middle agent 130 may identify the contents of the HTTP request 171. The middle agent 130 may generate and/or forward an HTTP request 173 to the local service (e.g., the local service 121) identified in the HTTP request 171. The local service 121 may receive the HTTP request 173 from the middle agent 130. The local service 121 may not be able to process the HTTP request 173, for example, based on being a non-HTTP service that operates according to one or more non-HTTP application layer protocols. The local service 121 may send a non-HTTP response 174 (e.g., an error response) according to the non-HTTP protocol of the local service 121, for example, based on receiving the HTTP request 171. The local service 121 may send the non-HTTP response 174 to the middle agent 130, for example, if the middle agent 130 included information in the HTTP request 173 to route a response from the local service 121 to the middle agent 130.

In some cases, the middle agent 130 may receive and/or intercept the non-HTTP response 174. Based on intercepting the non-HTTP response 174, the middle agent 130 may identify the non-HTTP response 174 as a non-HTTP response. The middle agent 130 may generate an HTTP response 175 (e.g., with an HTTP status line). The HTTP response 175 may include information identifying the local service 121 as the source of the HTTP response 175. The middle agent 130 may forward the HTTP response 175 to the web browser 112 (and the secure extension 113). The secure extension 113 may receive the HTTP response 175 from the middle agent 130. The secure extension 113 may determine that the received HTTP response 175 is an HTTP response, for example, based on determining that the received HTTP response 175 has an HTTP status line. The secure extension 113 may determine that communications via the web browser 112 are compromised, for example, based on determining the received HTTP response 175 is an HTTP response. The secure extension 113 may be configured to associate a received HTTP response (e.g., HTTP response 175) with compromised communications that include a middle agent (e.g., middle agent 130) operating on the browsing computing device 100. The secure extension 113 may generate one or more notifications for display at a display device (e.g., of the communications module 109) of the browsing computing device 100. For example, based on receiving an HTTP response 175, the secure extension 113 may generate a notification for display that indicates the communications of the web browser 112 are compromised. In some cases, the secure extension 113 may close/terminate a webpage (e.g., a tab), a window, and/or a session of the web browser 112, for example, based on determining the received response is an HTTP response. For example, at an HTTPS login webpage of a financial website accessed at the web browser 112 and hosted by server 151, based on determining the received response is an HTTP response, the secure extension 113 may close the HTTPS login webpage to prevent sending sensitive information (e.g., login credentials) that may be intercepted by the middle agent 130. Additionally or alternatively, the secure extension 113 may deactivate communications to and/or from the web browser 112, for example, based on determining the received response is an HTTP response.

Figure 2:
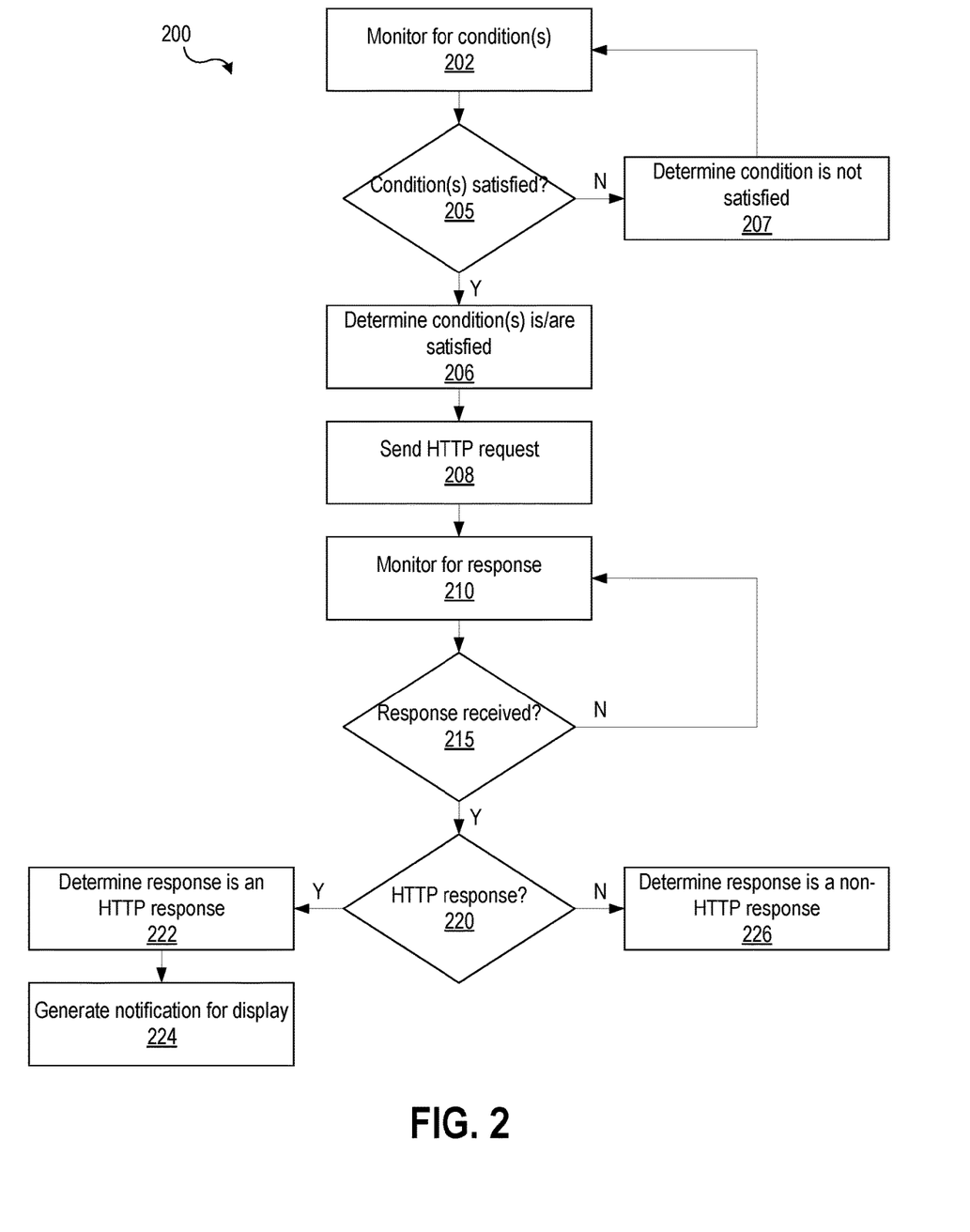
FIG. 2 shows an illustrative event sequence for a middle agent detection in accordance with one or more aspects described herein.

FIG. 2 shows an illustrative event sequence 200 for a middle agent detection in accordance with one or more aspects described herein. One or more steps of the illustrative event sequence 200 may be performed by the secure extension 113 operating as an extension to the web browser 112 and/or may be performed by a modified web browser that includes the functionality of secure extension 113 as described herein. The secure extension 113 may perform the one or more steps of the illustrative event sequence 200, for example, if the web browser is active (e.g., running, operating, and the like) on the browsing computing device 100. The secure extension 113 may monitor the web browser 112, outgoing network communications, and/or incoming network communications for one or more conditions at 202. The one or more conditions may include an activation and/or startup of the web browser 112. The one or more conditions may include a connection and/or an attempted connection (e.g., a connection request) to an HTTPS service via the web browser 112. The one or more conditions may include a connection and/or an attempted connection (e.g., a connection request) to configured services (e.g., domains) and/or configured webpages of configured services via the web browser 112. The one or more configured services may be configured by a developer and/or enterprise organization associated with the secure extension 113 and/or associated with a computing device that includes the secure extension 113 (e.g., the browsing computing device 100). For example, a developer may configure only a login web page for the domain of an e-commerce organization as a configured service and may not configure other webpages of the domain of the e-commerce organization as a configured service. The one or more conditions may include the expiration of a time duration (e.g., a periodic time duration) that may be configured by a developer and/or enterprise organization associated with the secure extension 113 and/or associated with a computing device that includes the secure extension 113 (e.g., the browsing computing device 100). For example, an enterprise organization associated with the browsing computing device 100 may configure a time duration of 10 minutes, where the secure extension 113 may determine that the condition is satisfied at the expiry of the time duration of 10 minutes.

The secure extension 113 may determine whether a condition of the one or more conditions is satisfied at 205. In some cases, the secure extension 113 may determine whether more than one of the one or more conditions is satisfied. Based on determining whether a condition of the one or more conditions is satisfied, the secure extension 113 may determine that at least one condition of the one or more conditions is satisfied at 206. In some cases, the secure extension 113 may require more than a threshold number of conditions to be satisfied at 206. For example, the secure extension 113 may require the browsing computing device 100 to access a service that is an HTTPS service and a configured service via the web browser 112 to satisfy the condition. The threshold number of conditions may be configured by a developer and/or enterprise organization associated with the secure extension 113 and/or associated with a computing device that includes the secure extension 113 (e.g., the browsing computing device 100). Based on determining whether a condition of the one or more conditions is satisfied, the secure extension 113 may determine that at least one condition of the one or more conditions is not satisfied at 207. In some cases, the secure extension 113 may determine that less than or equal to a threshold number of conditions was satisfied. Based on determining a condition (or less than and/or equal to a threshold number of conditions) of the one or more conditions is/are not satisfied, the secure extension 113 may continue to monitor for one or more conditions at 202 as described herein.

The secure extension 113 may send an HTTP request and/or cause the web browser 112 to send an HTTP request at 208. The secure extension 113 may send (or cause the web browser 112 to send) the HTTP request to a non-HTTP local service. The secure extension 113 may send the HTTP request, for example, via the web browser 112. The secure extension 113 may send (or cause the web browser 112 to send) the HTTP request, for example, based on determining a condition (or more than a threshold number of conditions) of the one or more conditions is/are satisfied. The secure extension 113 may monitor for a response at 210 such as, for example, via the web browser 112. The secure extension 113 may determine whether a response has been received at 215. Based on determining a response has not been received, the secure extension 113 may continue to monitor for a response at 210 as described herein.

Based on determining a response has been received, the secure extension 113 may determine whether the received response is an HTTP response at 220. The secure extension 113 may determine the received response is an HTTP response at 222, for example, if the response includes an HTTP status line. The secure extension 113 may determine that communications via the web browser 112 are comprised and generate a notification for display at 224. The secure extension 113 may determine that communications via the web browser 112 are compromised and generate a notification for display, for example, based on determining that the received response is an HTTP response. The notification may include an indication that communications via the web browser 112 are compromised. The secure extension 113 may determine that the received response is a non-HTTP response at 226. The secure extension 113 may determine that the received response is a non-HTTP response, for example, if the received response does not include an HTTP status line and/or if the web browser 112 cannot process/determine the received response. The secure extension 113 may determine that communications via the web browser 112 are secure (e.g., secure from the middle agent 130), for example, based on determining the received response is a non-HTTP response. Events of the illustrative event sequence 200 may be removed, supplemented, and/or otherwise modified without departing from the scope of the present disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing device, comprising:
   at least one processor;
   a communication interface communicatively coupled to the at least one processor; and
   memory storing computer-readable instructions that, when executed by the at least one processor, cause the computing device to:
      monitor, by a secure extension of a web browser, outgoing network connections for a connection request to a networked service;
      send, via a network based on an indication of the connection request and by the secure extension, a Hypertext Transfer Protocol (HTTP)-based request to a local service, wherein the local service is a non-HTTP service incapable of processing an HTTP request;
      receive, by the web browser, a response to the HTTP request;
      determine, by the secure extension and based on receiving the response, a format of the received response; and
      cause display, by the secure extension and via the web browser based on an identification that the received response is an HTTP response, of a notification, wherein the notification comprises an indication that communications via the web browser are compromised.

2. The computing device of claim 1, wherein the instructions, when executed by the at least one processor, cause the computing device to:
   monitor, by the secure extension, for an expiration of a time duration, wherein the time duration is defined in a configuration of the secure extension; and
   send, via the network based on an indication of the expiration of the time duration and by the secure extension, the HTTP request to the local service.

3. The computing device of claim 1, wherein the instructions, when executed by the at least one processor, cause the computing device to:
cause display, by the secure extension and via the web browser based on a second identification that the received response is a non-HTTP response, of a second notification, wherein the second notification comprises an indication that communications via the web browser are secure.

4. The computing device of claim 1, wherein the instructions, when executed by the at least one processor, cause the computing device to:
monitor, by the secure extension and based on the sent HTTP request, communications received by the browser for the response at the web browser.

5. The computing device of claim 1, wherein the instructions, when executed by the at least one processor, cause the computing device to:
deactivate, based on an indication that the received response is an HTTP response, the web browser.

6. The computing device of claim 1, wherein the instructions to determine the format of the received response further cause the computing device to:
generate, by the secure extension, an indication that the received response is an HTTP response based on an identification of an HTTP status line in the received response.

7. The computing device of claim 1, wherein the local service is accessible via a local network or hosted locally to the computing device.

8. A method, comprising:
monitoring, by a computing device comprising a secure extension of a web browser, outgoing network connections for a connection request to a networked service;
sending, via a network based on an indication of the connection request and by the secure extension, a Hypertext Transfer Protocol (HTTP) request to a local service, wherein the local service is a non-HTTP service;
determining, by the secure extension and based on receiving a response to the HTTP request, a format of the received response; and
causing display, by the secure extension and via the web browser based on an identification that the received response is an HTTP response, of a notification, wherein the notification comprises an indication that communications via the web browser are compromised.

9. The method of claim 8, further comprising:
monitoring, by the secure extension, for an activation of the web browser; and
sending, via the network based on an indication of the activation of the web browser and by the secure extension, the HTTP request to the local service.

10. The method of claim 8, further comprising,
causing display, by the secure extension and via the web browser based on a second identification that the received response is a non-HTTP response, of a second notification, wherein the second notification comprises an indication that communications via the web browser are secure.

11. The method of claim 8, further comprising:
monitoring, by the secure extension and based on the sent HTTP request, communications received by the browser for the response at the web browser.

12. The method of claim 8, further comprising:
deactivating, based on an indication that the received response is an HTTP response, networked communications via the web browser.

13. The method of claim 8, wherein the determining the format of the received response further comprises:
generating, by the secure extension, an indication that the received response is an HTTP response based on an identification of an HTTP status line.

14. The method of claim 8, wherein a configuration of the secure extension is defined by a developer associated with the secure extension or by an enterprise organization associated with the computing device.

15. One or more non-transitory computer-readable media storing instructions that, when executed by a computing device comprising at least one processor, memory, and a communication interface, cause the computing device to:
monitor, by a secure extension of a web browser, outgoing network connections for a connection request to a networked service;
send, via a network based on an indication of the connection request and by the secure extension, a Hypertext Transfer Protocol (HTTP) request to a local service, wherein the local service is a non-HTTP service and wherein the local service is identified in a configuration of the secure extension;
receive, by the web browser, a response to the HTTP request;
determine, by the secure extension and based on receiving the response, a format of the received response; and
cause display by the secure extension and via the web browser based on an identification that the received response is an HTTP response of a notification, wherein the notification comprises an indication that communications via the web browser are compromised.

16. The one or more non-transitory computer-readable media of claim 15, wherein the networked service is an HTTPS service or a configured service, wherein the configured service is identified in a configuration of the secure extension, and wherein the configuration of the secure extension is defined by a developer associated with the secure extension or by an enterprise organization associated with the computing device.

17. The one or more non-transitory computer-readable media of claim 15, wherein the instructions, when executed by the one or more processors, cause the computing device to:
cause display, by the secure extension and via the web browser based on a second identification that the received response is a non-HTTP response, of a second notification, wherein the second notification comprises an indication that communications via the web browser are secure.

18. The one or more non-transitory computer-readable media of claim 15, wherein the instructions, when executed by the one or more processors, cause the computing device to:
monitor, by the secure extension and based on the sent HTTP request, communications received by the browser for the response at the web browser.

19. The one or more non-transitory computer-readable media of claim 15, wherein the instructions, when executed by the one or more processors, cause the computing device to:
deactivate, based on an indication that the received response is an HTTP response, the web browser.

20. The one or more non-transitory computer-readable media of claim 15, wherein the instructions to determine the format of the received response further cause the computing device to:

generate, by the secure extension, an indication that the received response is an HTTP response based on an identification of an HTTP status line.

\* \* \* \* \*